United States Patent
Choi

(10) Patent No.: US 6,479,218 B1
(45) Date of Patent: Nov. 12, 2002

(54) METHOD FOR MANUFACTURING MULTI-DOMAIN LIQUID CRYSTAL CELL

(75) Inventor: Young Seok Choi, Kumi-shi (KR)

(73) Assignee: LG Philips LCD Co., Ltd, Seoul (KR)

( * ) Notice: Subject to any disclaimer, the term of this patent is extended or adjusted under 35 U.S.C. 154(b) by 0 days.

(21) Appl. No.: 09/686,815

(22) Filed: Oct. 12, 2000

(30) Foreign Application Priority Data

Oct. 14, 1999 (KR) ........................................ 1999-44621

(51) Int. Cl.⁷ ............................................ G02F 1/1337
(52) U.S. Cl. ..................... 430/321; 430/396; 349/124; 349/129
(58) Field of Search ............................... 430/321, 396, 430/20; 349/124, 129

(56) References Cited

U.S. PATENT DOCUMENTS

| | | | | |
|---|---|---|---|---|
| 3,912,920 A | 10/1975 | Kubota | ........................ | 240/9.5 |
| 4,974,941 A | 12/1990 | Gibbons et al. | ............. | 350/349 |
| 5,032,009 A | 7/1991 | Gibbons et al. | ............. | 350/341 |
| 5,073,294 A | 12/1991 | Shannon et al. | ........ | 252/299.01 |
| 5,296,321 A | 3/1994 | Kawanishi et al. | ........... | 430/20 |
| 5,389,698 A | 2/1995 | Chigrinov et al. | .............. | 522/2 |

(List continued on next page.)

FOREIGN PATENT DOCUMENTS

| | | |
|---|---|---|
| DE | 44 20 585 A1 | 6/1994 |
| DE | 197 03 682 A1 | 1/1997 |
| EP | 0 261 712 | 3/1988 |
| EP | 0 525 473 | 2/1993 |
| EP | 0 525 478 | 2/1993 |
| EP | 0 611 786 A1 | 2/1994 |
| EP | 0 635 748 A1 | 1/1995 |
| EP | 0 708 354 A1 | 4/1996 |
| EP | 0 742 471 A2 | 11/1996 |
| EP | 0 750 212 A2 | 12/1996 |
| EP | 0 549 283 B1 | 7/1997 |
| EP | 0 788 012 A2 | 8/1997 |
| GB | 2 281 977 A | 3/1995 |
| GB | 2 286 893 A | 8/1995 |
| GB | 2 309 793 A | 8/1997 |
| GB | 2 309 794 A | 8/1997 |
| GB | 2 310 048 A | 8/1997 |
| GB | 2 317 964 A | 4/1998 |
| GB | 2 319 093 A | 5/1998 |
| JP | 64-60833 | 3/1989 |
| JP | 1-251344 | 10/1989 |
| JP | 1-251345 | 10/1989 |
| JP | 2-55330 | 2/1990 |
| JP | 2-298917 | 12/1990 |
| JP | 3-36527 | 2/1991 |
| JP | 3-120503 A | 5/1991 |
| JP | 3 241 311 | 10/1991 |
| JP | 4-7520 | 1/1992 |

(List continued on next page.)

OTHER PUBLICATIONS

Gibbons, "Nature" (Letters to Nature); vol. 351; pp. 49–50; May 2, 1991.

Schadt et al., "Surface–Induced Parallel Alignment of Liquid Crystals"; Jpn. J. Appl. Phys. vol. 31; pp. 2155–2164; Jul. 1992.

(List continued on next page.)

Primary Examiner—John A. McPherson
(74) Attorney, Agent, or Firm—McKenna Long & Aldridge, LLP

(57) ABSTRACT

A method of manufacturing a multi-domain liquid crystal display device having a pixel includes the steps of forming an alignment film on at least one of a first and second substrate; covering the alignment film with a mask, there being included a first surface having a plurality of light-transmitting portions and light-shielding portions and a second surface having light-shielding portions corresponding to the light-transmitting portions; radiating light from an upper portion of the mask; and assembling the first and second substrates.

29 Claims, 15 Drawing Sheets

U.S. PATENT DOCUMENTS

| | | | |
|---|---|---|---|
| 5,447,662 A | 9/1995 | Herr et al. | 252/582 |
| 5,453,862 A | 9/1995 | Toko et al. | 359/76 |
| 5,464,669 A | 11/1995 | Kang et al. | 428/1 |
| 5,479,282 A | 12/1995 | Toko et al. | 359/75 |
| 5,538,823 A | 7/1996 | Park et al. | 430/20 |
| 5,539,074 A | 7/1996 | Herr et al. | 526/326 |
| 5,576,862 A | 11/1996 | Sugiyama et al. | 359/75 |
| 5,578,351 A | 11/1996 | Shashidhar et al. | 428/1 |
| 5,602,601 A | 2/1997 | Kim et al. | 348/607 |
| 5,604,615 A | 2/1997 | Iwagoe et al. | 349/124 |
| 5,627,667 A | 5/1997 | Mizushima et al. | 349/124 |
| 5,657,102 A | 8/1997 | Mizushima et al. | 349/124 |
| 5,657,105 A | 8/1997 | McCartney | 349/157 |
| 5,705,096 A | 1/1998 | Kano et al. | 252/299.4 |
| 5,712,696 A | 1/1998 | Toko et al. | 349/123 |
| 5,739,833 A * | 4/1998 | Chen et al. | 349/124 |
| 5,764,326 A | 6/1998 | Hasegawa et al. | 349/124 |
| 5,767,994 A | 6/1998 | Kang et al. | 359/72 |
| 5,784,139 A | 7/1998 | Chigrinov et al. | 349/117 |
| 5,786,041 A | 7/1998 | Takenaka et al. | 428/1 |
| 5,824,377 A | 10/1998 | Pirwitz et al. | 428/1 |
| 5,853,818 A | 12/1998 | Kwon et al. | 427/510 |
| 5,856,430 A | 1/1999 | Gibbons et al. | 528/353 |
| 5,856,431 A | 1/1999 | Gibbons et al. | 528/353 |
| 5,859,682 A | 1/1999 | Kim et al. | 349/124 |
| 5,880,803 A | 3/1999 | Tamai et al. | 349/156 |
| 5,882,238 A | 3/1999 | Kim et al. | 445/24 |
| 5,889,571 A | 3/1999 | Kim et al. | 349/124 |
| 5,909,265 A * | 6/1999 | Kim et al. | 349/129 |
| 5,928,561 A | 7/1999 | Bryan-Brown et al. | 252/299.4 |
| 5,963,448 A | 10/1999 | Flood et al. | 364/187 |
| 5,982,466 A | 11/1999 | Choi et al. | 349/124 |

FOREIGN PATENT DOCUMENTS

| | | |
|---|---|---|
| JP | 4-284421 | 10/1992 |
| JP | 4-350822 A | 12/1992 |
| JP | 5-19208 | 1/1993 |
| JP | 5-34699 A | 2/1993 |
| JP | 5-53513 A | 3/1993 |
| JP | 5-232473 | 9/1993 |
| JP | 7-56173 A | 3/1995 |
| JP | 7-261185 A | 10/1995 |
| JP | 7-318861 | 12/1995 |
| JP | 7-318942 A | 12/1995 |
| JP | 8-334790 A | 12/1996 |
| JP | 9-211465 A | 8/1997 |
| JP | 9-211468 | 8/1997 |
| JP | 9-265095 | 10/1997 |
| JP | 9-318946 | 12/1997 |
| JP | 10-078584 * | 3/1998 |
| JP | 10-90684 A | 4/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| WO | 94/01754 | 1/1994 |
| WO | 95/18189 | 7/1995 |
| WO | 95/22075 | 8/1995 |
| WO | 95/34843 | 12/1995 |
| WO | WO 96/22561 | 7/1996 |
| WO | 99/08148 | 2/1999 |

OTHER PUBLICATIONS

Yasufami Iimura et al.; "Alignment Control of a Liquid Crystal..."; Jpn. J. Appl. Phys.; vol. 32; pp. 93–96 (Jan.1993).

Kunihiro Ichimura; "Nematic Liquid Crystal Alignment"; MCLC; pp. 998–1001, 1044; Oct.1993.

Y. Toko et al.; "TN–LCDs Fabricated by Non–Rubbing Showing Wide..."; SID 93 Digest; pp. 622–625.

T. Sugiyama et al.; "Electro–Optic Characteristics of Amorphous..."; SID 94 Digest; pp. 915–918.

A. Lien et al.; "UV Modification of Surface Pretilt of Alignment Layers..."; Appl. Phys. Lett. 67 (21) pp. 3108–3110,1598 (Nov. 1995).

M. Schadt; "Investigation of the Mechanism of the Surface–Induced Alignment..."; SID 95 Digest; pp. 528–531.

J.L. West; "Polarized UV–Exposed Polyimide Films for Liquid–Crystal Alignment..."; SID 95 Digest; pp. 703–705.

T. Hashimoto; "TN–LCD with Quartered Subpixels Using Polarized..."; SID 95 Digest; pp. 877–800.

T. Saitoh et al.; "A New Hybrid N–TB Mode LCD..." Asia Display '95; pp. 589–592.

A. Lien et al.; "UV–Type Two–Domain Wide Viewing Angle..."; Asia Display '95; pp. 593–596.

T. Yamamoto et al.; "Liquid Crystal Alignment..."; SID 96 Digest; pp. 642–645 with 2 Cover Pages.

M. Schadt et al.; Optical Patterning of Multi–domain...; Nature vol. 381, pp. 212–215 (May 1996).

J. Chen et al.; "Model of Liquid Crystal Alignment..."; The American Physical Society; vol. 54 No. 2; pp. 1599–1603 (Aug. 1996).

H.S. Soh et al.; "The Realization of Wide Viewing Angle..."; Euro Display '96; pp. 579–582.

J. Chen et al.; "Mechanism of Liquid Crystal Alignment..." SID 96 Digest, pp. 634–637.

K. W. Lee et al.; "Late–News Poster: Mechanism of UV Modification..."; SID 96 Digest; pp. 638–641.

J. H. Kim et al.; "Late–News Poster: Photo–Alignment of Liquid Crystals"; SID '96 Digest; pp. 646–647, 649.

Y. Saitoh et al.; "Stability of UV–Type Two–Domain Wide–Viewing–Angle..."; SID 96 Digest; pp. 662–665.

D. S. Seo et al.; "Surface Alignment of Liquid Crystals in LCDs..."; SID 93 Digest; pp. 954–956.

Y. Iimura; "Prospects of the Photo–Alignment Technique..."; SID 97 Digest; pp. 311–314.

R. Shashidhar et al.; "A New Non–Rubbing Technique..."; SID 97 Digest; pp. 315–318.

M. Schadt et al.; "Optical Patterning of Multidomain LCDs..."; SID 97 Digest; pp. 397–400.

K. Y. Han et al.; "A Study on the Photo–Alignment of the Polymer–Containing..."; SID 97 Digest, pp. 707–710.

F. Yamada et al., "A New Photo–Alignment Scheme for LC–Cell Pretilt...", SID 97 Digest; pp. 715–718.

M.S. Nam et al., "Wide–Viewing–Angle TFT–LCD..."; SID 97 Digest; pp. 933–936.

Jpn. J. Appl. Phys., "Molecular Orientations and Optical Transmission Properties of Liquid Crystal Cells with Slit–Patterned Electrodes," vol. 36 (1997) 1178–1184.

Hasegawa et al., "Nematic Homogeneous Photo Alignment By Polyimide Exposure to Linearly Polarized UV," J. of Photopolymer Science and Technology, vol. 8, No. 2, pp. 241–248, 1995.

Shannon et al., "Patterned Optical Properties in Photopolymerized Surface–Aligned Liquid–Crystal Films," Nature, vol. 368, pp. 532–533, 1994.

* cited by examiner

METHOD FOR MANUFACTURING MULTI-DOMAIN LIQUID CRYSTAL CELL

BACKGROUND OF THE INVENTION

1. Field of the Invention

The present invention relates to a method or manufacturing a multi-domain liquid crystal cell, and more particularly, to a method for manufacturing a multi-domain liquid crystal cell in which a liquid crystal cell of a multi-domain liquid crystal cell having a wider viewing angle is obtained by a simple process.

2. Discussion of the Related Art

Recently, a liquid crystal display (LCD) mainly used for portable televisions or notebook computers requires a large sized screen, so as to be used for a wall type television or a monitor. A twisted-nematic (TN) liquid crystal cell is generally used as an LCD. The TN liquid crystal cell has different optical transmittivity characteristics at each gray level depending on viewing angles. For this reason, a large area of the TN liquid crystal cell is limited. That is, optical transmittivity is substantially symmetrical in view of a viewing angle in left and right direction while optical transmittivity is asymmetrical in view of us and down direction. Accordingly, an image inversion area exists in the viewing angle in up and down direction. As a result, there is a problem that the viewing angle becomes narrow. To solve such a problem, there is suggested a multi-domain liquid crystal cell in which a compensation effect of a viewing angle is obtained by varying a main viewing angle in each pixel. To obtain the multi-domain liquid crystal cell, a reverse rubbing process will be described with reference to FIG. 1.

As shown in FIG. 1a, an entire substrate 11 on which a polyimide 12 is deposited is processed by rubbing. Thus, a mono-domain is formed as shown in FIG. 1b. As shown in FIG. 1c, one domain is blocked by a photoresist 13. Rubbing is then performed in a direction opposite to the rubbing direction of FIG. 1a. As shown in FIG. 1d, a domain which is not blocked by the photoresist 13 is processed by reverse rubbing. As shown in FIG. 1e, if the photoresist 13 is removed, a substrate divided into two domains having opposite pretilt angles can be obtained.

However, the liquid crystal cell manufactured by the above rubbing process has problems in that dust or static electricity occurs during the rubbing process, thereby reducing yield or damaging the liquid crystal cell.

In another related art, to solve such problems, photo-alignment methods based on UV rays have been suggested instead of rubbing One photo-alignment method will be described with reference to FIG. 2. As shown in FIG. 2a, a substrate 21 on which an alignment film 22 is deposited is periodically shielded by a mask 23 having a light-transmitting portion 25 and a light-shielding portion 24. When light (solid line arrow in tilt direction on a top of the drawing) is irradiated at a tilt at an angle of θ, a first pretilt is determined in a portion 26 where light is transmitted. As shown in FIG. 2b, the mask 23 is rearranged to shield light in the portion 26. Then, when light (solid line arrow in tilt direction on a top of the drawing) is irradiated at a tilt at an angle of −θ, a second pretilt is determined in a portion 27 where light is shielded in FIG. 2a. Thus, as shown in FIG. 2c, a first substrate of two domains having different pretilts can be obtained. Also, as shown in FIG. 2d, a second substrate of two domains can be obtained by the above alignment method and lower and upper substrates are assembled with each other.

Furthermore, as shown in FIG. 3, areas Q and R are light-shielded, and the photo-alignment methods having an angle θ of irradiation in FIGS. 2a and 2b are sequentially applied to areas O and P as shown in FIGS. 3a and 3b. The areas O and P are then light-shielded, and the photo-alignment methods having an angle θ of irradiation in FIGS. 2a and 2b are sequentially applied to the areas Q and R as shown in FIGS. 3c and 3d. Thus, light irradiation of total four times is performed on the substrate, thereby obtaining a substrate having four domains.

As described above, the first substrate and the second substrate in which four domains are formed are bonded to face each other and then the liquid crystal is injected thereto, so that a four-domain liquid crystal cell can be obtained.

In still another related art, as shown in FIG. 4a, a semi-transparent portion 43 of a mask is arranged in some area of a substrate 41 on which an alignment film 42 is deposited, and then light irradiation is performed. Thus, the irradiated light is absorbed in the alignment film 42 on the substrate 41 in an aperture portion. However, some of the irradiated light is only absorbed in the alignment film 42 in an area of the alignment film 42 of the substrate 41 corresponding to the semi-transparent portion 43 of the mask. Polysiloxane based materials used as the alignment film 42 are characterized in that the size of tie pretilt angle becomes small as absorbing light energy increases. Accordingly, the size of the pretilt angle formed in the alignment film can easily be controlled. Based on this characteristic, a substrate having different pretilt angles and divided pixels is manufactured, and a sectional view of the substrate is shown in FIG. 4b. As shown in FIG. 4c, a liquid crystal cell is manufactured in such a manner that upper and lower substrates are bonded to each, other by applying the substrate of FIG. 4b. In this structure, alignment direction of each domain is identical in each substrate but the size of the pretilt angle is different. Accordingly, a multi-domain is formed to improve a viewing angle. Also, in case that the divided pixels are applied, a four domain liquid crystal cell can be obtained as shown in FIG. 5. In this case, areas III and IV are light-shielded and the photo-alignment method of FIG. 4a is applied to areas I and II (see FIGS. 5a to 5d). Subsequently, the areas I and II are light-shielded, and in the areas III and IV, a four-domain substrate is obtained by varying polarization direction of tie irradiated light in the photo-alignment method of FIG. 4a (see FIGS. 5e to 5h). After the first and second substrates in which four domains are formed are bonded to each other by the above method, the liquid crystal is injected into the substrates so as to obtain a four-domain liquid crystal cell.

However, the methods for manufacturing a liquid crystal cell through the photo-alignment methods have several problems in controlling alignment direction of the multi-domain to realize a wider viewing angle.

The first method requires light irradiation of eight times (vertical irradiation of four times and tilt irradiation of four times) into the upper and lower substrates to form a multi-domain divided into two pixel areas, and mask bond no process of four times. Moreover, to form a multi-domain having four domains, the process steps increase two times. Thus, in addition to light irradiation and mask bonding processes of several times, a cap between the masks and the substrate should additionally be controlled. These process steps are unattractive in view of the mass production. The second method requires light irradiation of four times (vertical irradiation of two times and tilt irradiation of two times) into the upper and lower substrates and mask bonding process of two times when forming a multi-domain having two domains. In the second method, the light irradiation and the mask bonding process steps have been reduced but error may occur in arranging a number of masks, thereby reducing the productivity.

SUMMARY OF THE INVENTION

Accordingly, the present invention is directed to a method for manufacturing a multi-domain liquid crystal cell that substantially obviates one or more of the problems due to limitations and disadvantages of the related art.

An object of the present invention is to provide a method for manufacturing a multi-domain liquid crystal cell fin which a photo mask required for photo-alignment is improved to perform tilt irradiation having two different directions by irradiation of one time, so that alignment division of a unit pixel can be realized and a multi-domain liquid crystal cell can be obtained by a simple process.

Another object of the present invention is to provide a method for manufacturing a multi-domain liquid crystal cell in which the number of masks is reduced to reduce error that may occur in arranging the masks due to control of a gap between the masks and the substrate.

Additional features and advantages of the invention will be set forth in the description which follows, and in part will be apparent from the description, or may be learned by practice of the invention. The objectives and other advantages of the invention will be realized and attained by She scheme particularly pointed out in the written description and claims hereof as well as the appended drawings.

To achieve these and other advantages and in accordance with the purpose of the present invention, as embodied and broadly described, a method for manufacturing a multi-domain liquid crystal display device having a pixel comprising the steps of: forming an alignment film on at least one of first and second substrates; covering the alignment film with a mask, the mask including a first surface having a plurality of light-transmitting portions and light-shielding portions and a second surface having light-shielding portions corresponding to the light-transmitting portions of the second surface; irradiating light from an upper portion of the mask; and assembling the first and second substrates.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 6:
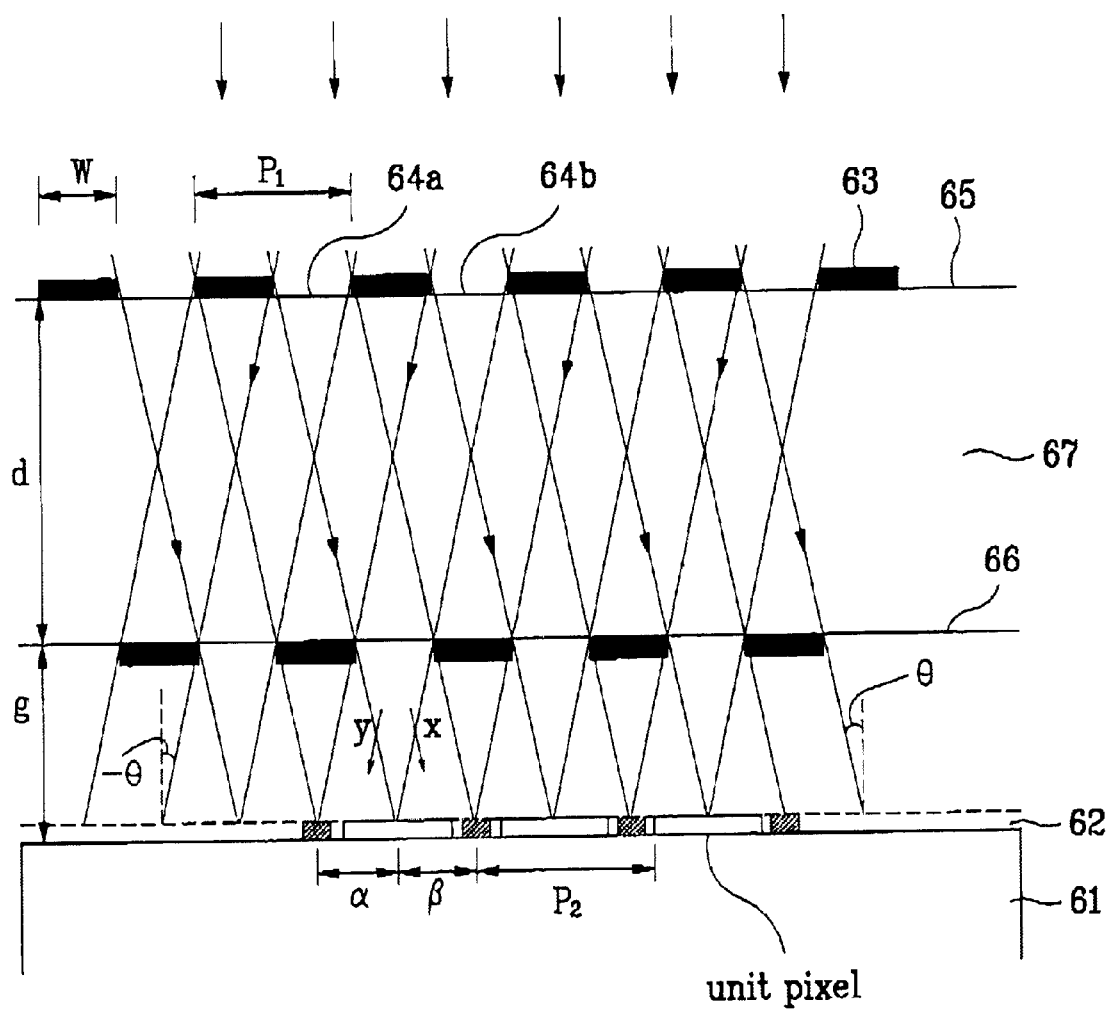
FIG. 6 shows a process for manufacturing a two-domain liquid crystal cell according to a photo-alignment method using a mask of the present invention.

FIG. 6 shows a process for manufacturing a two-domain liquid crustal cell in which a pixel is alignment divided by UV irradiation of one time using a mask. Referring to FIG. 6, an alignment film 62 is deposited on a substrate 61. A plurality of firs and second light-transmitting portions 64a and 64b and light-shielding portions 63 are arranged at constant intervals on a first surface 65 of the substrate 61 on which the alignment film is deposited.

A mask 67 is arranged on a second surface 66 in such a manner that the light-shielding portion is arranged in a position corresponding to the light-transmitting portion of the first surface 65 and the light-transmitting portion is arranged in a position corresponding to the light-shielding portion. Then, UV irradiation is performed using the mask 67 as shown in a tilt solid arrow on a top of FIG. 6. As shown in FIG. 6, the light irradiated to the first light-transmitting portions 64a is obliquely irradiated at an angle of θ in a direction of arrow x so that the light is absorbed in a first domain of the alignment film 62 on the substrate 61. The light irradiated to the second light-transmitting portions 64b is tilt irradiated at an angle of –θ in a direction of arrow y so that the light is absorbed in a second domain of the alignment film 62 on the substrate 61. Accordingly, two different tilt irradiation steps are performed by irradiation of one time to alignment-divide a unit pixel, so that a liquid crystal cell having simply divided domains can be manufactured. At this time, since the size of the pixel is defined as shown in FIG. 5, the following conditions should be satisfied.

$p_1$(mask pattern period)=$p_2$(pixel pitch)

w(mask pattern width)=$p_1$/2 d(distance between the first surface and the second surface of the mask)=w x tan θ (θ is an angle of irradiation)

g(distance between the second surface of the mask and the alignment film)=d/2.

In the above conditions, the mask pattern period is an arrangement period of the light-transmitting portion or the light-shielding portion of the mask, the pixel pitch is an arrangement period of the pixel, and the mask pattern width is a width of the light-transmitting portion or light-shielding portion.

The liquid crystal cell can be manufactured by applying the photo-alignment method of FIG. 6 to the upper and lower substrates.

In the above pixel division method, the irradiation angle can be controlled variously by varying the distance between the first surface and the second surface based on w xtan θ. If the irradiation angle is varied, the size of the pretilt angle in each domain of the substrate is varied. Accordingly, the viewing angle between neighboring domains is compensated, so that the multi-domain liquid crystal cell can be obtained by the simple process.

Figure 7A:
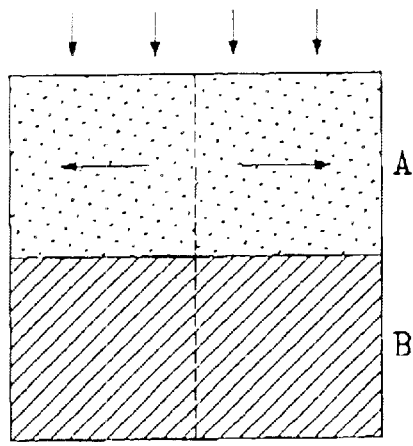
FIG. 7 shows a process for manufacturing a four-domain liquid crystal cell according to a photo-alignment method using a mask of the present invention.
Figure 7B:
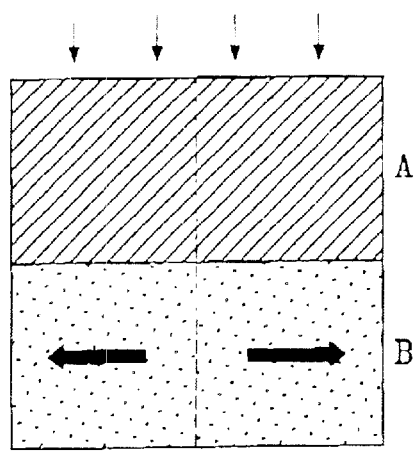
Figure 7C:
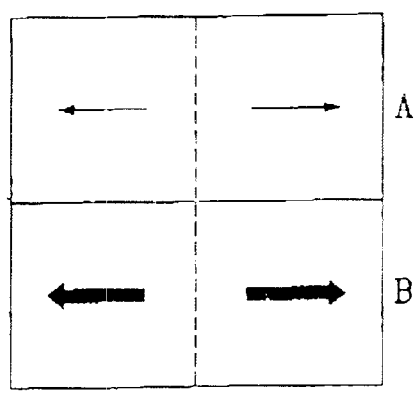

FIG. 7 shows a method for forming a four-domain liquid crystal cell by applying the above method. That is, referring to FIG. 7a, a first area A filled with dots on the substrate on which the alignment film is deposited is covered with the above mask while a second area B filled with oblique lines is covered with an opaque mask. In this case, as shown in FIG. 6, the first light irradiation of UV (solid line arrow on a top in the drawing) is performed at an angle of θ to alignment-divide one pixel. Thus, a pretilt is formed by the first light irradiation as shown in FIG. 7a. In FIG. 7a, the left arrow of the first area A denotes a pretilt direction generated by UV in direction y passed through the second light-transmitting portion 64b, i.e., UV irradiated at an angle of −θ, while the right arrow of the first area A denotes a pretilt direction generated by UV in direction x passed through the first light-transmitting portion 64a, i.e., UV irradiated at an angle of θ. A pretilt is not formed in the second area B of the alignment film corresponding to the opaque portion having optical transmittivity of 0%. However, two domains having different pretilt directions are formed in the area covered with the mask. Next, as shown in FIG. 7b, the first area A in which the pretilt is determined is covered with the opaque mask while the second area A is covered with the mask 67 having the distance d' between the first surface 65 and the second surface 66. In this case, since the irradiation angle is varied to θ due to the variation from d to d' of the distance between the first surface 65 and the second surface 66, the second light irradiation (solid arrow on a top of the drawing) can be performed in the second area B to have a pretilt angle different from that of the first area A. Thus, a pretilt is formed by the second light irradiation as shown in FIG. 7b. In FIG. 7b, the left arrow of the second area B denotes a pretilt direction generated by UV in direction y passed through the second light-transmitting portion 64b, i.e., UV irradiated at an angle of −θ, while the right arrow of the second area B denotes a pretilt direction generated by UV in direction x passed through the first light-transmitting portion 64a, i.e., UV irradiated at an angle of θ. Since the second light irradiation is blocked by the mask in the first area A of the alignment film corresponding to the opaque portion having optical transmittivity of 0%, the pretilt formed by the first irradiation remains in the same manner as FIG. 7a. In case of the varied distance d' between the first surface 65 and the second surface 66, two domains having pretilt directions different from the first area A are formed in the second area B covered with the mask, so that the pixel is divided into four (see FIG. 7c).

Figure 1A:
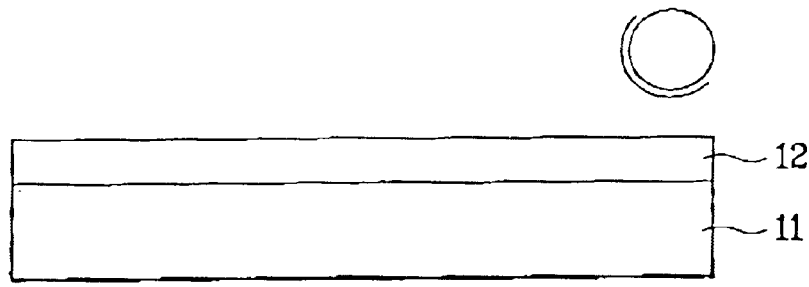
FIG. 1 shows a process for manufacturing a two-domain liquid crystal cell according to a related art rubbing method.
Figure 1B:
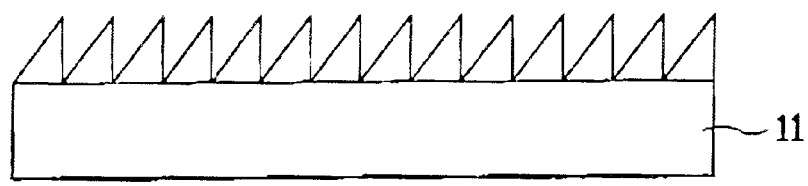
Figure 1C:
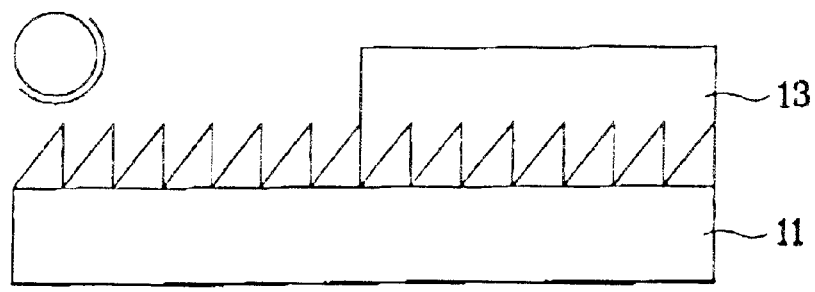
Figure 1D:
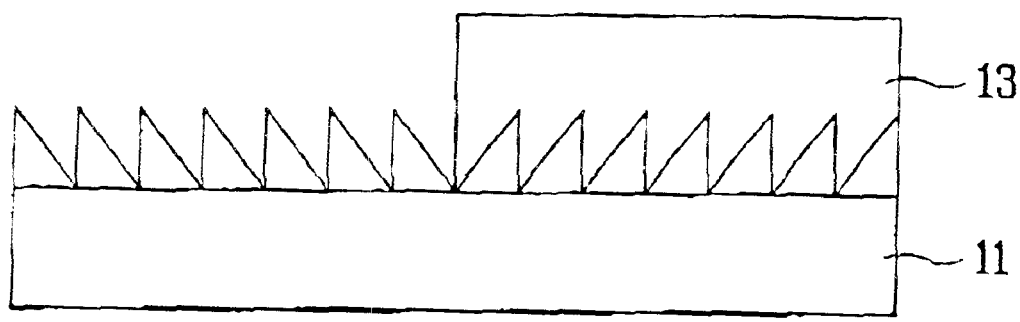
Figure 1E:
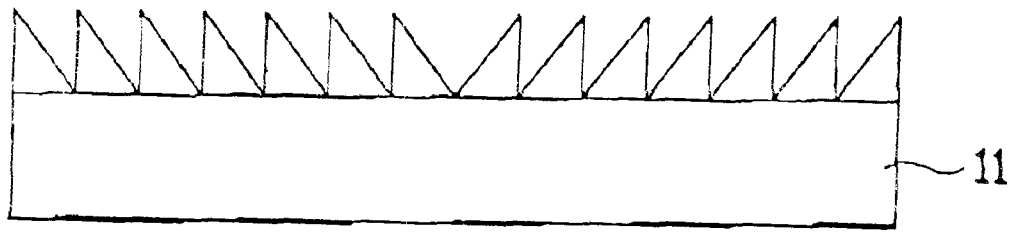
Figure 2A:
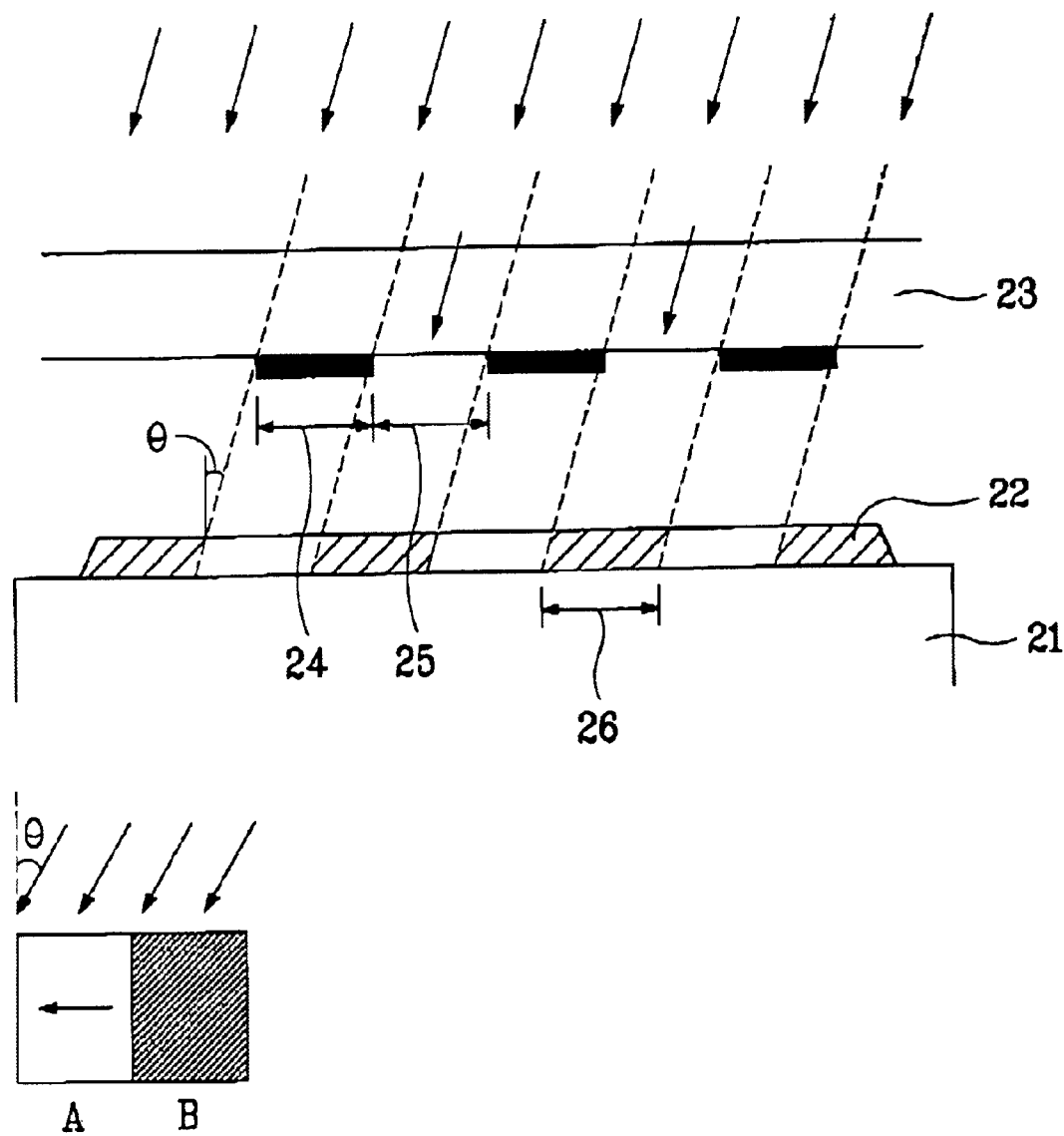
FIG. 2 shows a process for manufacturing a two-domain liquid crystal cell according to a related art photo-alignment method.
Figure 2B:
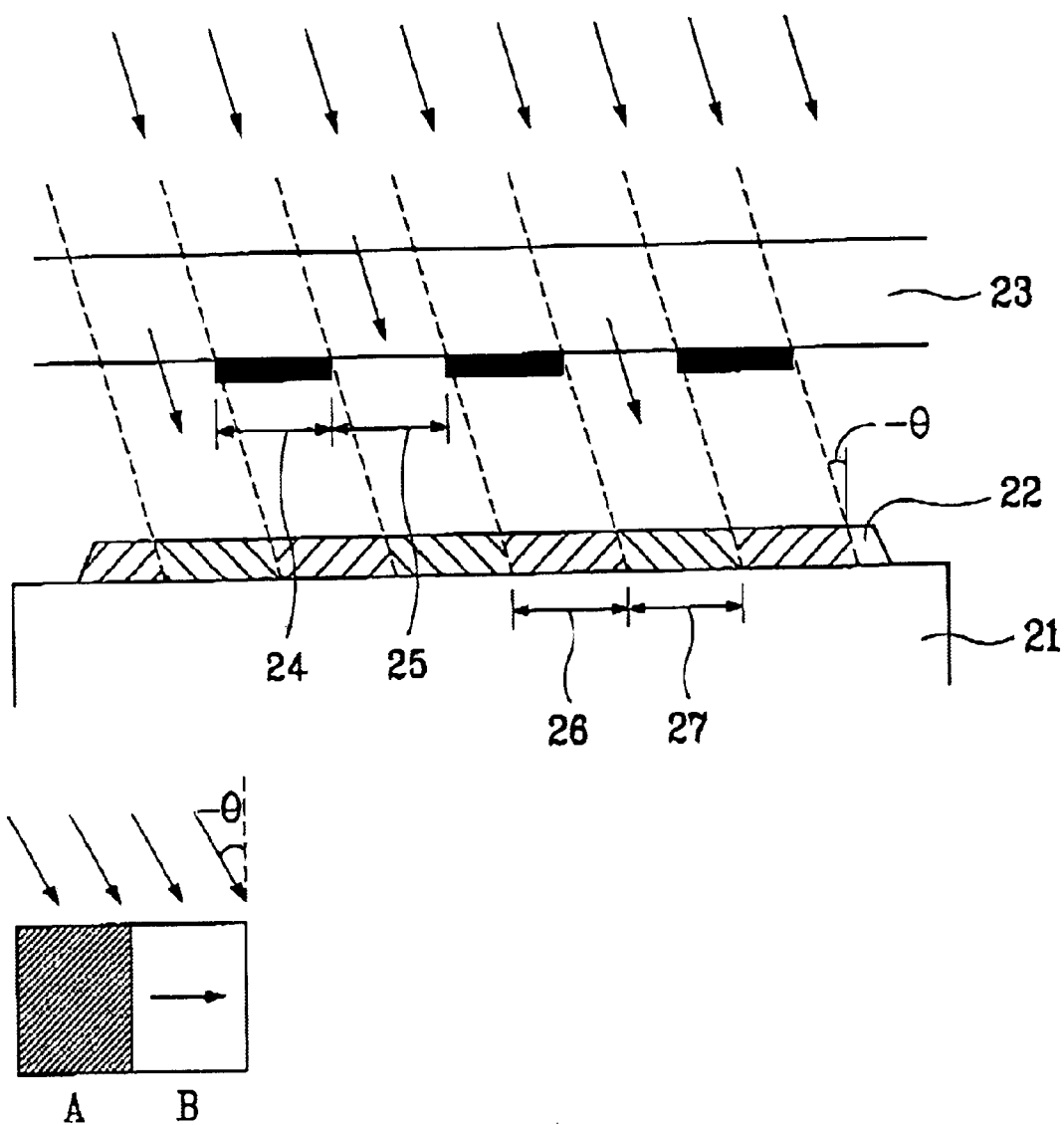
Figure 2C:
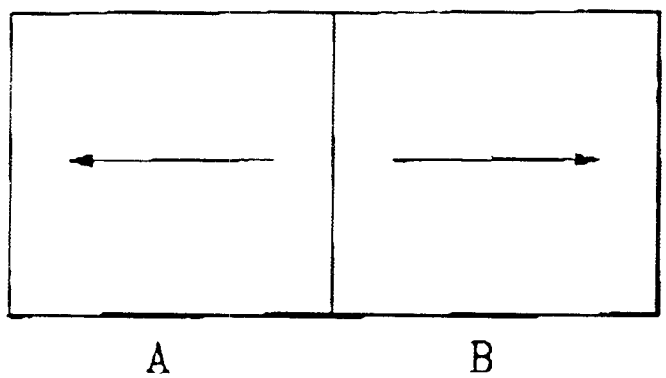
Figure 2D:
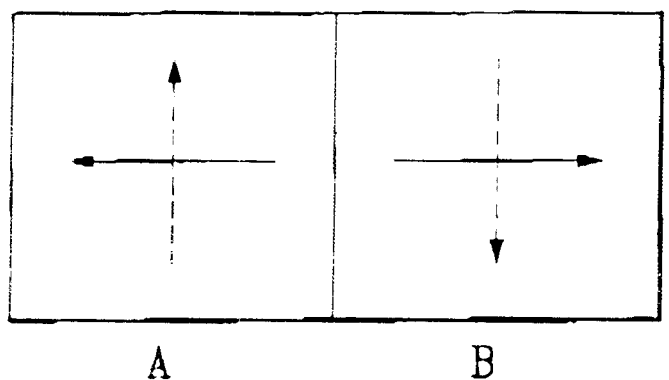
Figure 3A:
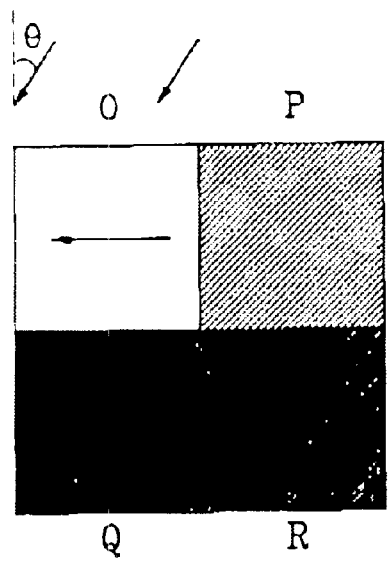
FIG. 3 shows a process for manufacturing a four-domain liquid crystal cell according to a related art photo-alignment method.
Figure 3B:
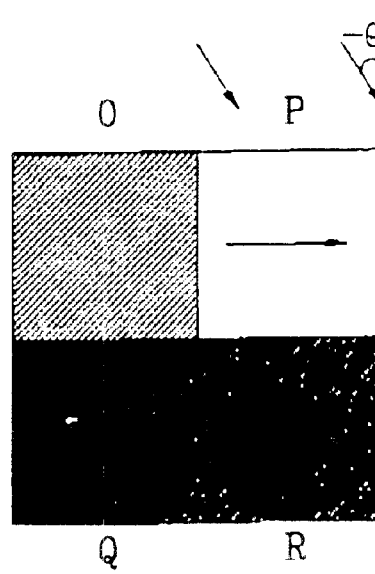
Figure 3C:
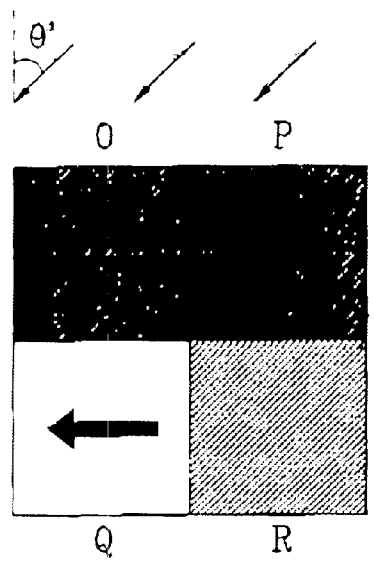
Figure 3D:
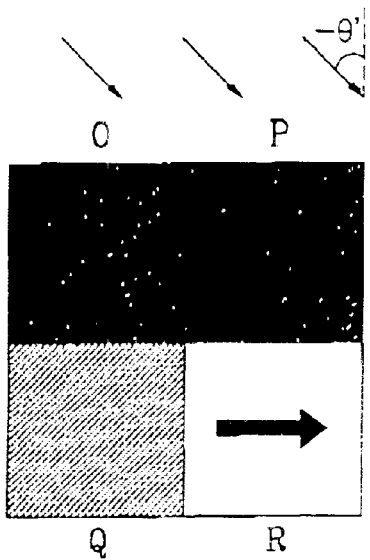
Figure 3E:
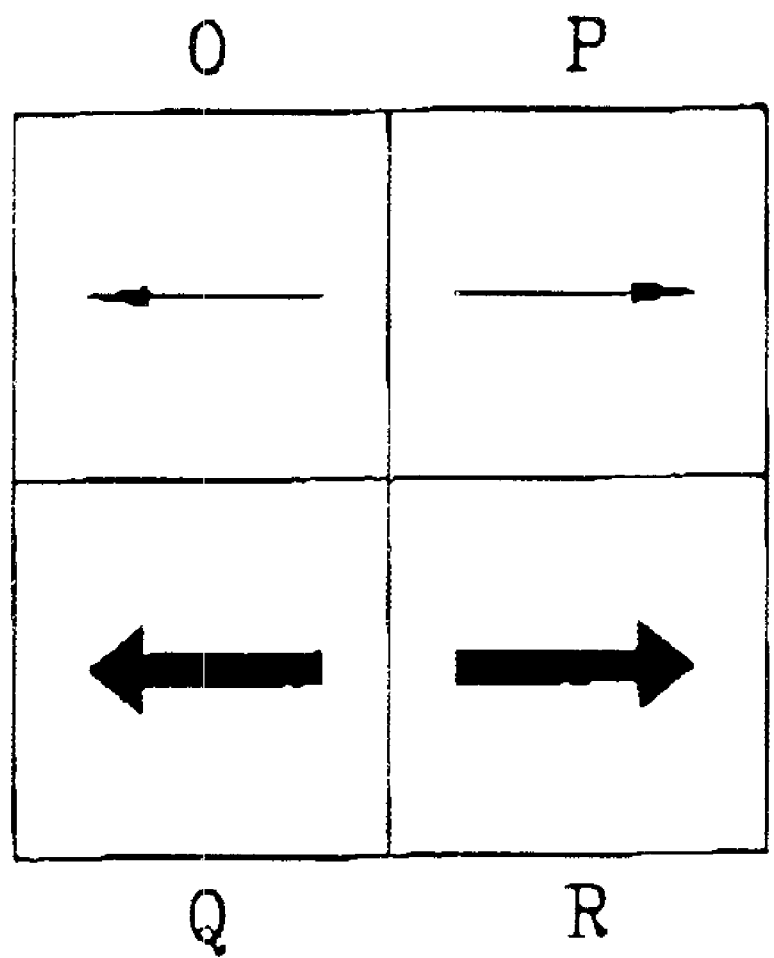
Figure 4A:
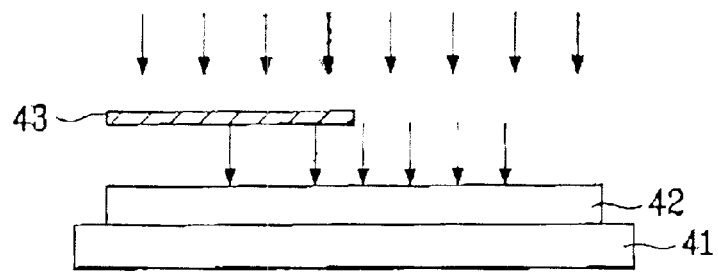
FIG. 4 shows a process for manufacturing a two-domain liquid crystal cell according to a related art another photo-alignment method.
Figure 4B:
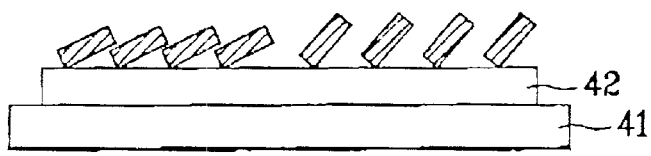
Figure 4C:
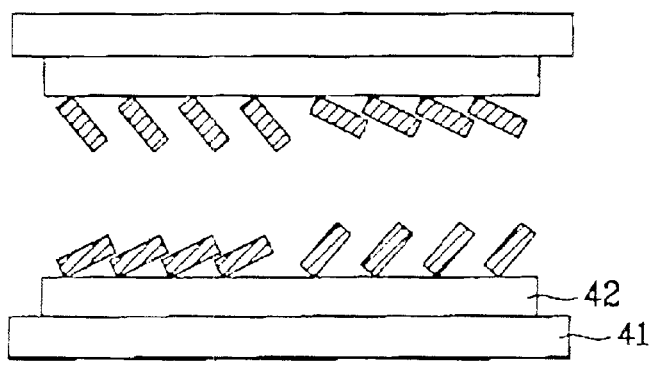
Figure 5A:
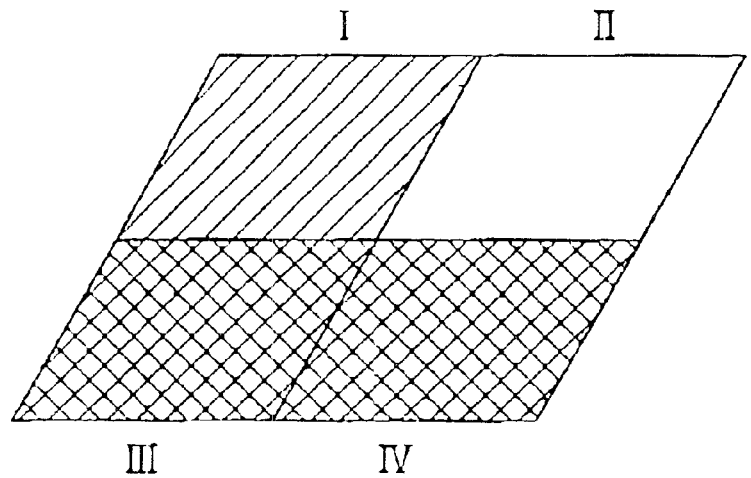
FIG. 5 shows a process for manufacturing a four-domain liquid crystal cell according to a related art another photo-alignment method.
Figure 5B:
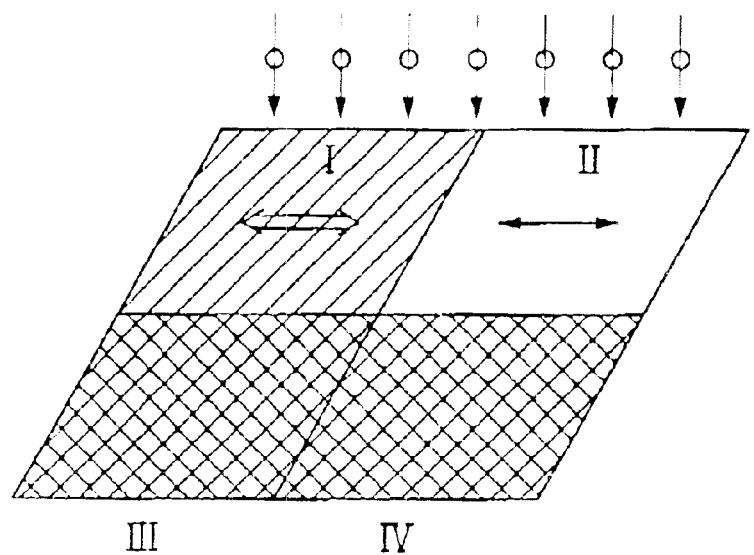
Figure 5C:
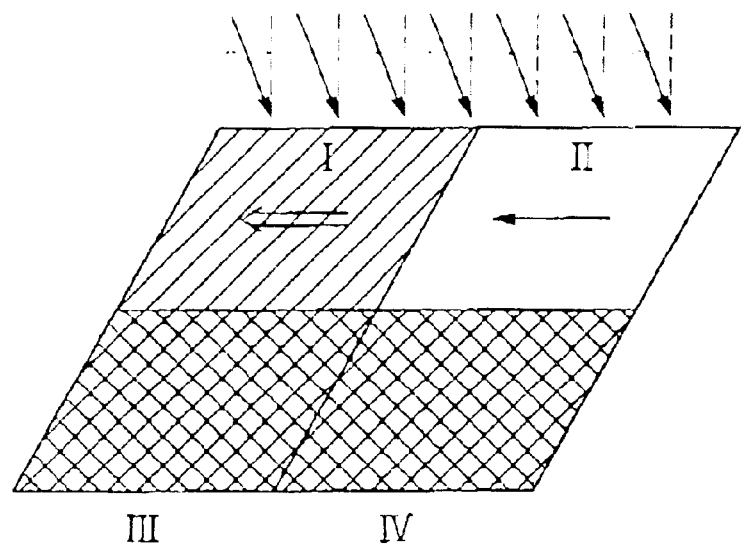
Figure 5D:
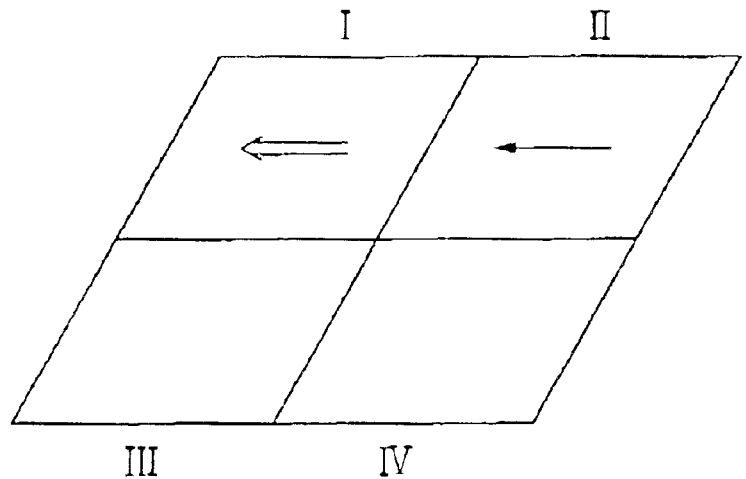
Figure 5E:
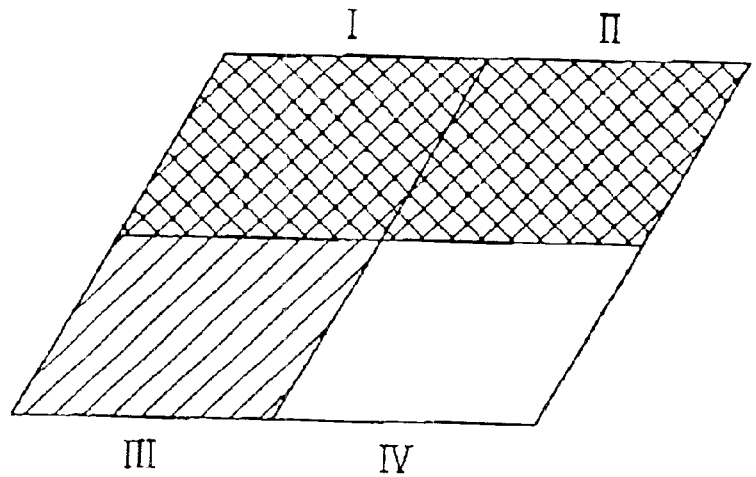
Figure 5F:
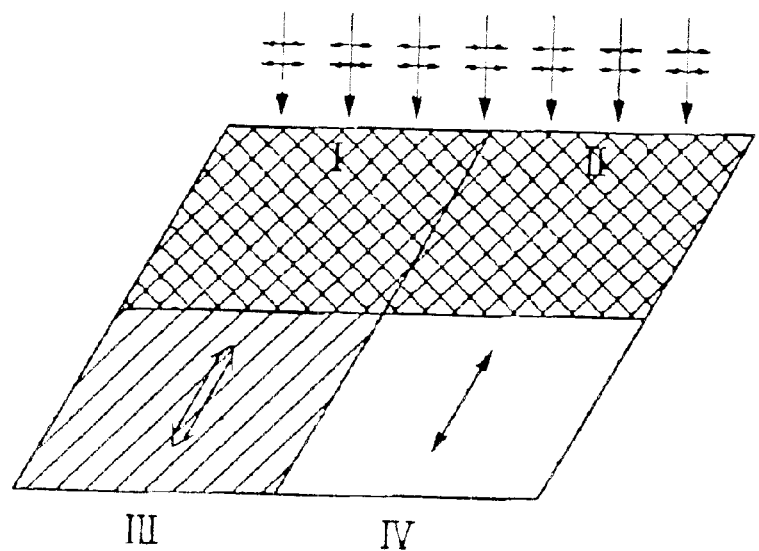
Figure 5G:
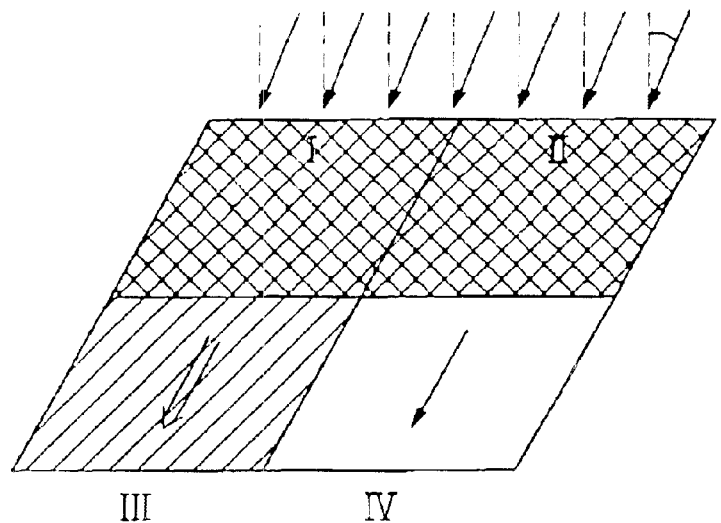
Figure 5H:
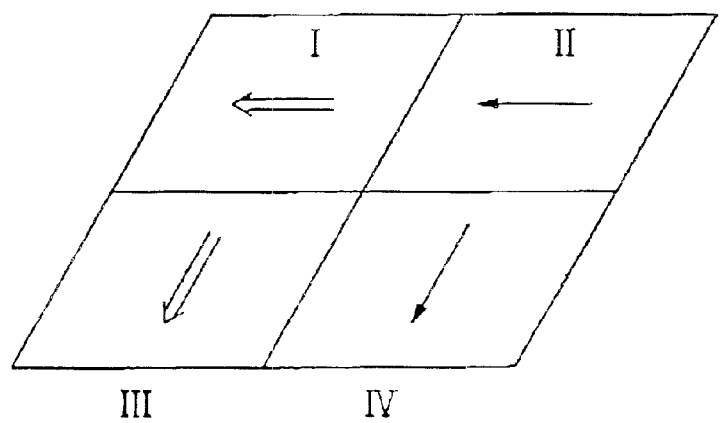

If the four-domain substrate obtained by the above method is applied to the upper and lower substrates, the main liquid crystal cell of FIG. 4 can be formed.

As aforementioned, the method for manufacturing a multi-domain liquid crystal cell has the following advantages.

In the present invention, the light-transmitting portions and the light-shielding portions are arranged on the first surface at constant intervals, and the photo-alignment is performed using the mask which is formed in such a manner that the light-shielding portions are arranged in a position corresponding to the light-transmitting portion of the first surface and the light-transmitting portions are arranged in a position corresponding to the light-shielding portion. Accordingly, alignment division of the unit pixel can be realized by irradiation of one time and the number of the manufacturing process steps can be reduced. Furthermore, since alignment division of the pixel is realized by one mask, the steps of arranging a number of masks are reduced. Thus, error that may occur in arranging the masks is reduced, so that reliability of the alignment is improved, thereby improving the productivity and lowering the production cost in case of mass production.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for manufacturing a multi-domain liquid crystal display device having a pixel comprising the steps of:
   forming an alignment film on at least one of first and second substrates;
   covering the alignment film with a mask, the mask including a first surface having a plurality of light-transmitting portions and light-shielding portions and a second surface having light-shielding portions corresponding to the light-transmitting portions of the first surface;
   irradiating light from an upper portion of the mask; and
   assembling the first and second substrates.

2. The method of claim 1, wherein the light-transmitting portions and the light-shielding portions of the first surface are arranged at constant interval.

3. The method of claim 2, wherein the arrangement interval of the light-transmitting portions is identical with an arrangement interval of the pixel.

4. The method of claim 2, wherein the arrangement interval of the light-shielding portions is identical with an arrangement interval of the pixel.

5. The method of claim 2, wherein the width of the light-transmitting portions includes a half width of the arrangement interval of the mask.

6. The method of claim 2, wherein the width of the light-shielding portions includes a half width of the arrangement interval of the mask.

7. The method of claim 1, wherein a distance d between the first surface and the second surface of the mask includes d=w×tan θ (w is a pattern width of the a mask and θ is an angle of irradiation).

8. The method of claim 7, wherein the irradiation angle depends on the distance d.

9. The method of claim 8, wherein a pretilt angle of the pixel depends on the irradiation angle.

10. The method of claim 9, wherein the pretilt angle of the pixel corresponding to the plurality of light-transmitting portions of the first surface is different from the pretilt angle of the pixel corresponding to the plurality of light shielding portions of the second surface.

11. The method of claim 1, wherein a distance between the second surface of the mask and the alignment film is a half of the distance between the first surface and the second surface of the mask.

12. The method of claim 1, wherein the mask includes a glass.

13. The method of claim 1, wherein the mask includes a quartz.

14. The method of claim 1, wherein the light includes ultraviolet rays.

15. The method of claim 1, further comprising the step of forming a liquid crystal layer between the first and second substrates.

16. The method of claim 1, wherein the step of irradiating includes obliquely irradiating.

17. A method for manufacturing a multi-domain liquid crystal display device having a pixel comprising the steps of:
   forming an alignment film on at least one of first and second substrates;

irradiating light on the substrates using a mask including a first surface having a plurality of first light-shielding portions, and a second surface isolated from the first surface and having a plurality of second light-shielding portions except for the first light-shielding portions; and assembling the first and second substrates.

18. The method of claim 17, wherein the first light-shielding portions and the second light-shielding portions are formed at constant intervals, respectively.

19. The method of claim 17, wherein the width of the first and second light-shielding portions includes a half width of the arrangement interval of the mask.

20. The method of claim 17, wherein a distance d between the first surface and the second surface of the mask includes $d = w \times \tan\theta$ (w is a pattern width of the a mask and $\theta$ is an angle of irradiation).

21. The method of claim 20, wherein the irradiation angle depends on he distance d.

22. The method of claim 21, wherein a pretilt angle of the pixel depends on the irradiation angle.

23. The method of claim 22, wherein the pretilt angle of the pixel corresponding to the first light-shielding portions is different from the pretilt angle of the pixel corresponding to the second light-shielding portions.

24. The method of claim 17, wherein a distance between the second surface of the mask and the alignment film is a half of the distance between the first surface and the second surface of the mask.

25. The method of claim 17, wherein the mask includes a glass.

26. The method of claim 17, wherein the mask includes a quartz.

27. The method of claim 17, wherein the light includes ultraviolet rays.

28. The method of claim 17, further comprising the step of forming a liquid crystal layer between the first and second substrates.

29. The method of claim 17, wherein the step of irradiating includes obliquely irradiating.

* * * * *